Dec. 27, 1927.
J. F. WATT
1,653,829
BARREL AND THE LIKE HOOP AND METHOD OF JOINING THE ENDS
Filed July 7, 1925
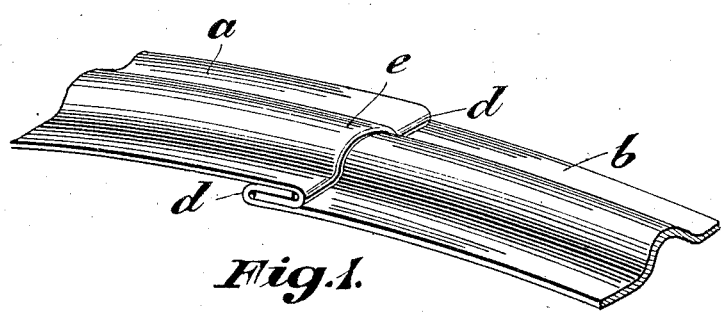
*Fig. 1.*
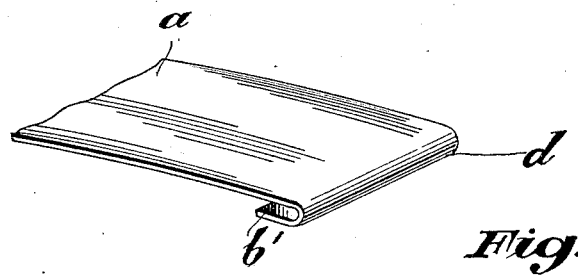
*Fig. 2.*
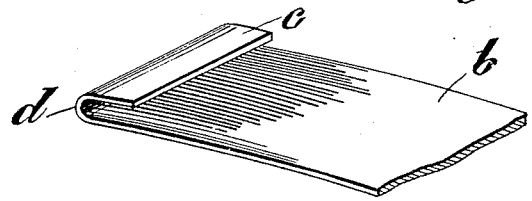
*Fig. 3.*
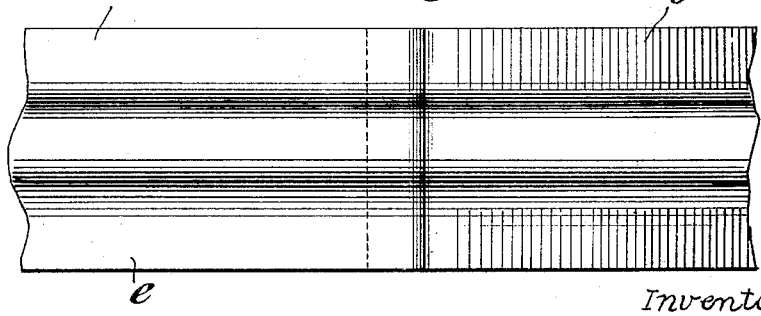
Inventor
John Fordyce Watt
By J. Kaplan
Attorney Patented Dec. 27, 1927.

1,653,829

UNITED STATES PATENT OFFICE.

JOHN FORDYCE WATT, OF ABERDEEN, SCOTLAND.

BARREL AND THE LIKE HOOP AND METHOD OF JOINING THE ENDS.

Application filed July 7, 1925, Serial No. 42,075, and in Great Britain May 11, 1925.

This invention relates to barrel and the like hoops both corrugated and plain and it refers in particular to the method of joining the ends of such hoops together.

As now generally constructed the ends of the hoops are punched for the reception of rivets which are used as the means for securing the ends of the hoop together.

This method has the disadvantage that the rivet holes weaken the material at the joint necessitating a comparatively large overlap. It also has the disadvantage that the strain of fixing the hoop in position over a barrel or the like often results in the shearing of the rivets or the enlargement of the rivet holes or both causing the joint, in one case, to spring. In addition such a joint leaves the rough edge of the overlapping end of the hoop exposed with the result that such exposed edge is a source of danger to the hands of the person handling both the hoops and the cask or the like on which they are fitted.

The object of the present invention is to provide an improved method of joining the hoop which will obviate all of the above disadvantages, and with this object in view the invention consists broadly in joining the ends of barrel and the like hoops by doubling over the extremities of both ends of the hoop, and engaging one doubled over extremity with the other.

The invention also consists in corrugating. welding or otherwise securing the engaged extremities so as to prevent the joint from slipping when being driven on the barrel or the like.

In order that the invention may be clearly understood an embodiment of the same as applied to a corrugated hoop will now be described by aid of the accompanying drawings in which:—

Fig. 1 is a perspective view of a portion of a corrugated hoop showing the ends joined together in accordance with this invention.

Fig. 2 is a perspective view showing the ends of the hoop after being turned over but before being engaged and corrugated.

Fig. 3 is a plan view of Figure 1.

In the drawings $a$ and $b$ represent the two ends of the hoop and $b'$ and $c$ the bent over extremities thereof which extremities are interengaged with each other as shown in Figure 1.

By thus bending over the extremities of the ends of the hoop rounded edges $d$ are formed which considerably reduce if not entirely obviate the risk of damage to the hands of the workers when fitting the hoops or handling the cask or the like on which they are fitted.

As shown in Fig. 2 the extremities of the ends of the hoop are bent over before the hoop is corrugated.

The corrugating operation is effected when the bent over extremities are engaged with each other, such a corrugation which is longitudinal of the hoop being indicated at $e$ in Figure 1. The effect of this corrugating operation on the joint is to flatten the engaged extremities onto each other and provide a means for preventing the joint from slipping when the hoop is being driven over the barrel or the like.

More than one corrugation may be formed in the joint if desired although for all practical purposes a single corrugation is sufficient.

In the case of plain or non-corrugated hoops, such a corrugation may be made at the joint only or the same effect may be attained by welding the engaged extremities together.

It will thus be seen that by means of this invention a strong and secure joint is made in a very simple manner and by reason of the absence of any weakening holes, a small overlap only is required with a consequent saving of metal.

Claim:

A hoop for casks consisting of a closed metal ring having interengaged extremities which is constructed by bending a flat strip of material into the form of a circle, bending over the extremities of such strip upon themselves and in opposite directions whereby one extremity is turned inwards and the other extremity is turned outwards, engaging such bent over extremities one with the other and finally locking the engaged extremities by forming a corrugation longitudinally of and extending completely across the said engaged extremities, the convex side of the corrugation being on the outside of the hoop.

JOHN FORDYCE WATT.